(12) United States Patent
Dobre

(10) Patent No.: US 10,445,338 B2
(45) Date of Patent: Oct. 15, 2019

(54) METHOD AND SYSTEM FOR REPLICATING DATA IN A CLOUD STORAGE SYSTEM

(71) Applicant: NEC EUROPE LTD., Heidelberg (DE)

(72) Inventor: Dan Dobre, Munich (DE)

(73) Assignee: NEC CORPORATION, Tokyo (JP)

(*) Notice: Subject to any disclaimer, the term of this patent is extended or adjusted under 35 U.S.C. 154(b) by 1068 days.

(21) Appl. No.: 14/416,309

(22) PCT Filed: Jul. 23, 2013

(86) PCT No.: PCT/EP2013/065537
§ 371 (c)(1),
(2) Date: Jan. 22, 2015

(87) PCT Pub. No.: WO2014/016306
PCT Pub. Date: Jan. 30, 2014

(65) Prior Publication Data
US 2015/0178364 A1 Jun. 25, 2015

(30) Foreign Application Priority Data

Jul. 23, 2012 (EP) .................................. 12177437

(51) Int. Cl.
*G06F 16/27* (2019.01)
*G06F 16/182* (2019.01)
*H04L 29/08* (2006.01)

(52) U.S. Cl.
CPC ............ *G06F 16/27* (2019.01); *G06F 16/184* (2019.01)

(58) Field of Classification Search
CPC ......... G06F 17/30212; G06F 17/30575; G06F 16/27; G06F 16/184; H04L 67/1095

USPC ........................................................ 707/620
See application file for complete search history.

(56) References Cited

U.S. PATENT DOCUMENTS

| 7,500,020 B1 | 3/2009 | Kabra et al. |
| 2004/0213387 A1* | 10/2004 | Chandrasekaran ......... G06F 17/30353 379/93.24 |
| 2008/0163220 A1* | 7/2008 | Wang ...................... G06F 8/458 718/101 |

(Continued)

OTHER PUBLICATIONS

Cristina Basescu et al: "Robust data sharing with key-value stores", Dependable Systems and Networks (DSN), 2012 $42^{nd}$ Annual IEEE/IFIP International Conference on, IEEE, Jun. 25, 2012, pp. 1-12, XP032220297.

*Primary Examiner* — James Trujillo
*Assistant Examiner* — Jessica N Le
(74) *Attorney, Agent, or Firm* — Leydig, Voit & Mayer, Ltd.

(57) ABSTRACT

A method for replicating data in a cloud storage system supporting multiple clients, wherein the cloud storage system comprises a plurality of object storing entities (A, B, C) for storing data objects, includes requesting, by a client, values and associated timestamps for a first data object from a first quorum of the object storing entities (A, B, C). The method further includes determining, by the client, a most recent value of the first data object based on the associated timestamps. The method additionally includes performing, by the client, a compare-and-swap procedure, so that the determined value and its corresponding timestamp for the first data object updates the first data object with a value with a newer timestamp and stores the first data object in a second quorum of the object storing entities (A, B, C).

8 Claims, 4 Drawing Sheets

(56) References Cited

U.S. PATENT DOCUMENTS

| | | | |
|---|---|---|---|
| 2009/0240664 A1* | 9/2009 | Dinker | G06F 12/0842 |
| 2011/0066668 A1* | 3/2011 | Guarraci | G06F 17/30233 |
| | | | 707/831 |
| 2011/0153566 A1* | 6/2011 | Larson | G06F 17/30356 |
| | | | 707/638 |
| 2011/0208695 A1* | 8/2011 | Anand | G11B 27/002 |
| | | | 707/610 |
| 2013/0085999 A1* | 4/2013 | Tung | G06F 11/1451 |
| | | | 707/654 |
| 2013/0268740 A1* | 10/2013 | Holt | G06F 21/00 |
| | | | 711/163 |

* cited by examiner

```
Initialization:
1     ts ← 0;
2     for all i ∈ S do ⟨x[i], x'[i], pending[i]⟩ ← ⟨⊥, ⊥, false⟩;
3     new ← ⟨0, v₀⟩;
4     R₁, R₂, TS ← ∅;
5     done ← false;
   WRITE(val)
6     PHASE1:
7         for all i ∈ S do
8             invoke x[i] ← read(xᵢ);
9         repeat
10            for all i ∈ S \ R₁ do
11                if x[i] ≠ ⊥ then R₁ ← R₁ ∪ {i};
          until done;
12        wait until |R₁| ≥ ⌈(|S| + 1)/2⌉;

13        for all i ∈ R₁ do TS ← TS ∪ {x[i].ts};
14        ts ← inc(max(TS));
15        new ← ⟨ts, val⟩;

PHASE2:
16        repeat
17            for all i ∈ R₁ \ R₂ do
18                if new.ts ≤ x[i].ts then R₂ ← R₂ ∪ {i};
19                if new.ts > x[i].ts ∧ ¬pending[i] then
20                    invoke x'[i] ← CAS(xᵢ, x[i], new);
21                    pending[i] ← true;
22            for all i ∈ R₁ \ R₂ do
23                if x'[i] ≠ ⊥ then
24                    if x'[i] = x[i] then R₂ ← R₂ ∪ {i};
25                    x[i] ← x'[i];
26                    x'[i] ← ⊥;
27                    pending[i] ← false;
          until R₂ ≥ ⌈(|S| + 1)/2⌉;
28        done ← true;

29    return ack;
                                    a)
                              WRITE protocol.
   READ()
30    PHASE1;
31    for all i ∈ R₁ do
32        if x[i].ts > new.ts then new ← x[i];
33    PHASE2;
34    return new.val;           b)
                              READ protocol.
```

Fig. 4

METHOD AND SYSTEM FOR REPLICATING DATA IN A CLOUD STORAGE SYSTEM

CROSS-REFERENCE TO RELATED APPLICATIONS

This application is a U.S. National Phase application under 35 U.S.C. § 371 of International Application No. PCT/EP2013/065537 (WO 2014/016306 A1), filed on Jul. 23, 2013, and claims benefit to European Patent Application No. EP 12177437.6, filed Jul. 23, 2012.

FIELD

The present invention relates to cloud storage systems, an in particular, to cloud storage systems that support multiple clients and that include a plurality of object storing entities for storing data objects.

BACKGROUND

In the age of cloud computing, data and computation are increasingly outsourced to cloud providers and therefore reliable cloud storage solutions are receiving unprecedented attention. For example by relying on a single cloud storage provider this may have disastrous consequences if the data is lost. The spectrum of problems leading to data loss and loss of availability ranges from power outages in data centers to corruption of the data, to bankruptcy of a data service company, etc.

One conventional cloud storage service is, for example, Amazon S3 providing an object store with basic write (object) and read (object) functionality. However, one of the drawbacks is that to build a reliable read/write object from a plurality of unreliable read/write objects requires storage proportional to the total number of clients in the underlying system. For example, in the non-patent literature Robert Haas, Alessandro Sorniotti, Marko Vukolic and Ido Zachevsky: Robust Data Sharing with Key-Value Stores. DSN 2012 an atomic object store is disclosed building top of a collection of key value stores application programmable interfaces that—besides write/read operations—have an additional list functionality providing an atomic snapshot of all keys in the key value store. However, one of the drawbacks is that in the worst case, the space complexity is proportional to the number of clients.

An increasing number of cloud storage services have also started providing besides read and (blind) writes also so-called conditional writes, for example provided by the Amazon Simple Database, Windows Azure Blob Storage, Google Storage, etc. These conditional writes are a mechanism for optimistic concurrency control in distributed systems and can be used for instance to prevent lost updates.

SUMMARY

In an embodiment, the present invention provides a method for replicating data in a cloud storage system supporting multiple clients, wherein the cloud storage system comprises a plurality of object storing entities for storing data objects, the method including: requesting, by a client, values and associated timestamps for a first data object from a first quorum of the object storing entities; determining by the client, a most recent value of the first data object based on the associated timestamps; and performing, by the client, a compare-and-swap procedure, so that the determined value and its corresponding timestamp for the first data object updates the first data object with a value with a newer timestamp and stores the first data object in a second quorum of the object storing.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows a detailed pseudo-code implementation of parts of a method according to a fourth embodiment of the present invention.

DETAILED DESCRIPTION

Figure 1:
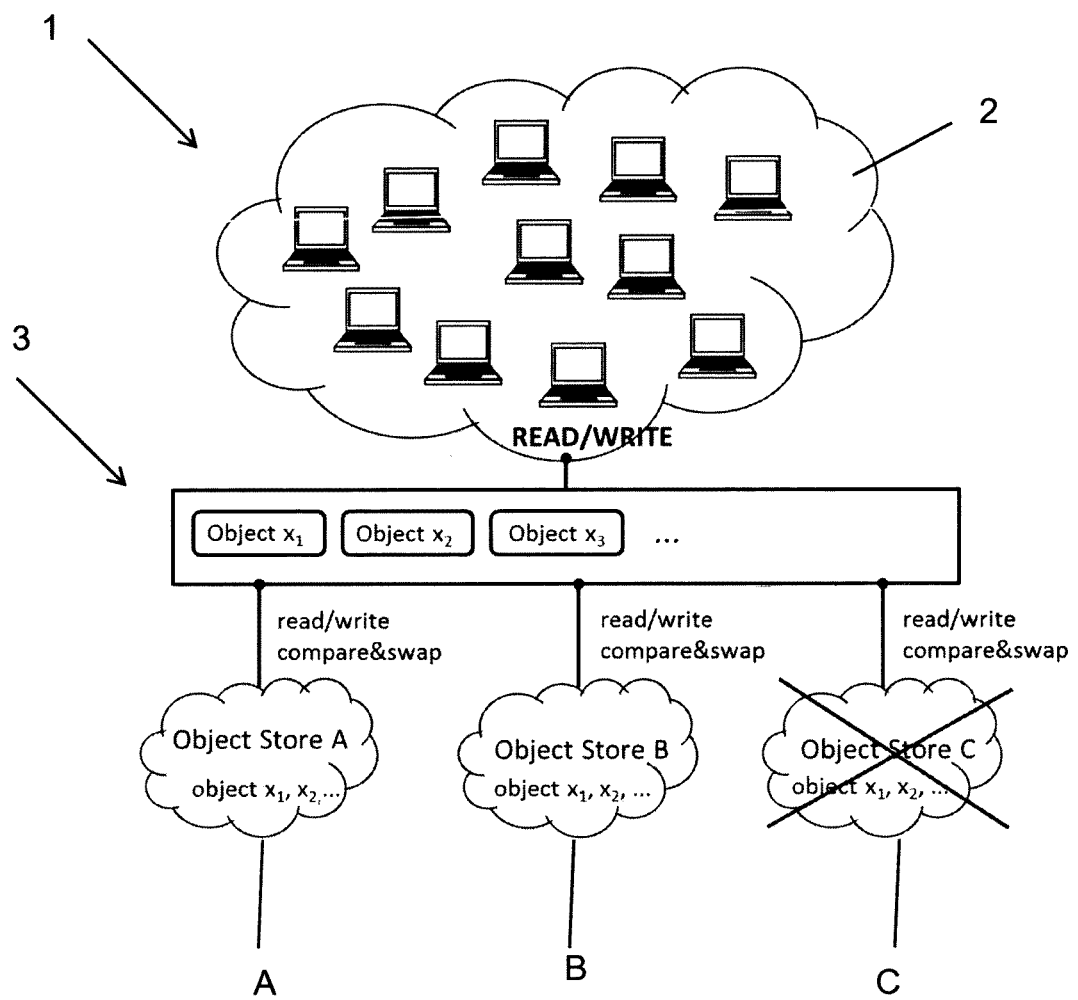
FIG. 1 shows a system according to a first embodiment of the present invention.

An embodiment of the present invention leverages conditional writes to provide a method and a system for replicating data in a cloud storage system supporting a possibly unbounded respectively large number of clients.

An embodiment of the present invention provides a method and a system for replicating data in a cloud storage system enabling a storage-efficient atomic object store.

An embodiment of the present invention provides a method and a system for replicating data in a cloud storage system which are robust to asynchrony.

An embodiment of the present invention provides a method and a system for replicating data in a cloud storage system enabling concurrency, robustness to crashes by clients and crashes of a minority of the underlying object stores.

According to an embodiment, a method is provided for replicating data in a cloud storage system supporting multiple clients, wherein the cloud storage system comprises a plurality of object storing entities for storing the data objects is defined.

According to the embodiment, the method is characterized by the steps of a) requesting values and associated timestamps for a data object from a first quorum of object storing entities, b) determining the most recent value of the data object based on the associated timestamp, and c) performing a compare-and-swap procedure, so that the determined value and its corresponding timestamp for the data object updates the data object with the value with a newer timestamp and stores the data object in a second quorum of object storing entities, the steps a)-c) are performed on a client.

According to an embodiment, a system is provided for replicating data in a cloud storage system, wherein the cloud storage system comprises a plurality of object storing entities for storing the data objects is defined.

According to an embodiment the system is characterized by a client operable to request values and associated timestamps for the data object from a first quorum of object storing entities, to determine the most recent value of the data object based on the associated timestamp, and to perform a compare-and-swap procedure, so that the determined value and its corresponding timestamp for the data object updates the data object with the value with a newer timestamp and stores the data object in a second quorum of object storing entities.

The term "supporting multiple clients" means preferably in the description, in particular in the claims, that consistency is preserved in the presence of clients concurrently accessing replicated data.

According to an embodiment of the invention it has been recognized that a reliable atomic storage layer from multiple unreliable object stores, for example clouds, is enabled using a conditional write application programming interface.

According to an embodiment of the invention it has been further recognized that the embodiment is robust providing guaranteed availability and consistency despite asynchrony, concurrency and failures by clients and a minority of object stores.

According to an embodiment of the invention it has been further recognized that the embodiment is easy to implement, since current storage application programming interfaces supporting conditional writes can be used out-of-the box without modifications.

According to an embodiment of the invention it has been even further recognized that the embodiment is storage-efficient, because only one value per data object is enabled to be stored and in particular the present invention is independent of the number of clients accessing the storage.

According to an embodiment of the invention it has been further recognized that efficiency in terms of latency is enhanced: Few remote operations, for example in contention-free executions, only two remote operations, are issued per storage entity/node.

In general, embodiments of the present invention can be used with network-attached storage with conditional write functionality, for example preferably within a data-center.

Further features, advantages and preferred embodiments are described in the following subclaims.

According to an embodiment for reading a data object, before step b) the further step of checking whether a data object with a value with a more recent timestamp exists and if yes this value and its corresponding timestamps is used for step c). This enables a reliable read operation while ensuring atomic consistency. This further ensures that newer values are never overwritten with older values.

According to a further embodiment a compare-and-swap procedure returns as result the old content of the data object. This allows in an easy way to determine if the content of the data object has been changed between steps b) and c).

According to a further embodiment when between steps b) and c) the data object is modified, for example by a write operation for the data object, steps a) and b) are not performed anymore and step c) is performed until the data object is not modified anymore between two consecutive performances of step c) and/or until a quorum of object storing entities reports values for the data object whose corresponding timestamps are greater or equal than the timestamp of the determined value of a data object according to step b). When write operations are performed between step b) and step c), atomic consistency can be ensured by re-invoking step c), i.e. updating an object using the compare-and-swap procedure. Further termination is guaranteed since only a final number of operations exist that write respectively write back values with lower timestamps. Consequently every operation by correct clients eventual terminates irrespective of other clients behavior ensuring wait-freedom.

According to a further embodiment for step c) additional responses of object storing entities not associated with the first quorum to the requesting step a) are included. This takes for example into account that object storing entities become unreachable between steps a), b) and c), for example by crashing. Thus, reliability is further enhanced.

FIG. 1 shows a system according to a first embodiment of the present invention.

In FIG. 1 an illustration of a multi-cloud storage is shown. The multi cloud storage system 1 comprises a plurality of clients 2 performing read and/or write operation on data objects stored in the multi cloud storage 3. The multi cloud storage 3 comprises different object stores A, B, C, each storing objects x1, x2, etc. When a client 2 performs a read/write operation on the data objects x1, x2, etc. a corresponding read/write operation is performed on the object store A, B, C. Of course a compare-and-swap operation may also be performed on the data object stored in the object stores A, B, C.

Figure 2:
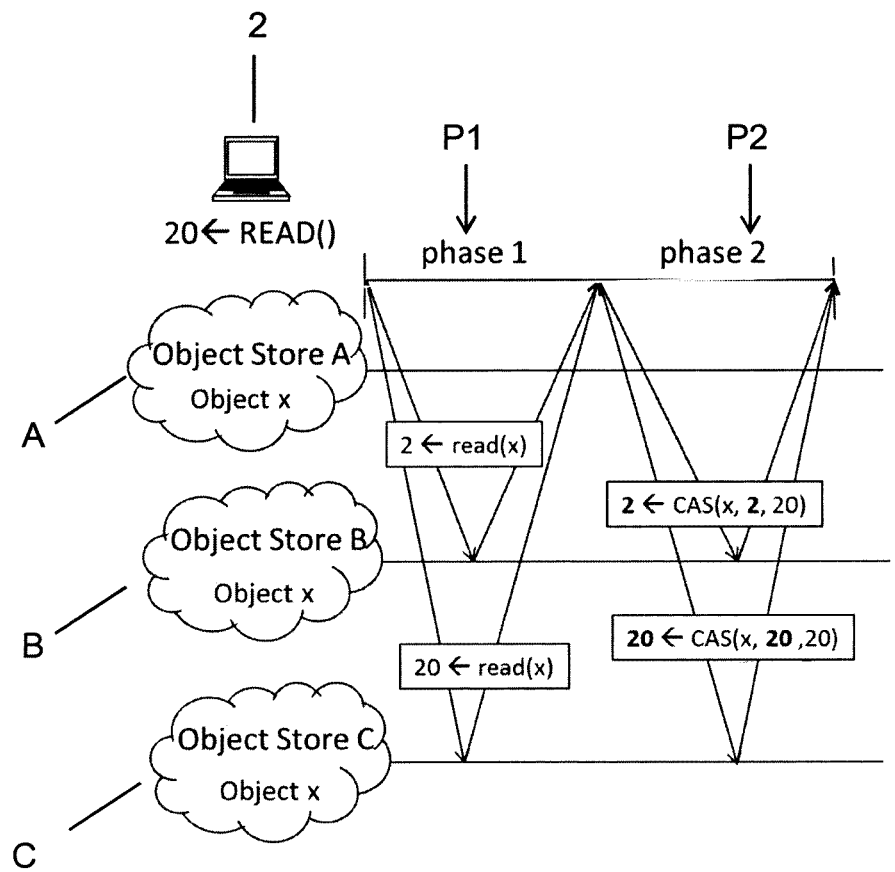
FIG. 2 shows a flow diagram of a part of a method according to a second embodiment of the present invention.

FIG. 2 shows a flow diagram of a part of a method according to a second embodiment of the present invention.

In FIG. 2 a flow diagram of a read operation by a client 2 in contention-free execution is shown. In a first phase P1 the client 2 reads the values of the data object x from object store B returning a timestamp value of 2 for a value v and another read operation on the object x returns a timestamp value of 20 for the value v in another object store C. After that the first phase P1 is finished.

Then in a second phase P2 the client 2 initiates a compare-and-swap procedure CAS for the data object x with the timestamp value 2 and the newer timestamp value 20: CAS(x, 2, 20) The compare-and-swap procedure CAS is performed by the client 2 for object store B and returns as result of the compare-and-swap procedure the old timestamp value 2 and for object store C the timestamp value of 20 is returned for the corresponding data object x with value v. Therefore the compare-and-swap procedure CAS has updated the data object x in object store B with a value v with the more recent timestamp 20.

Figure 3:
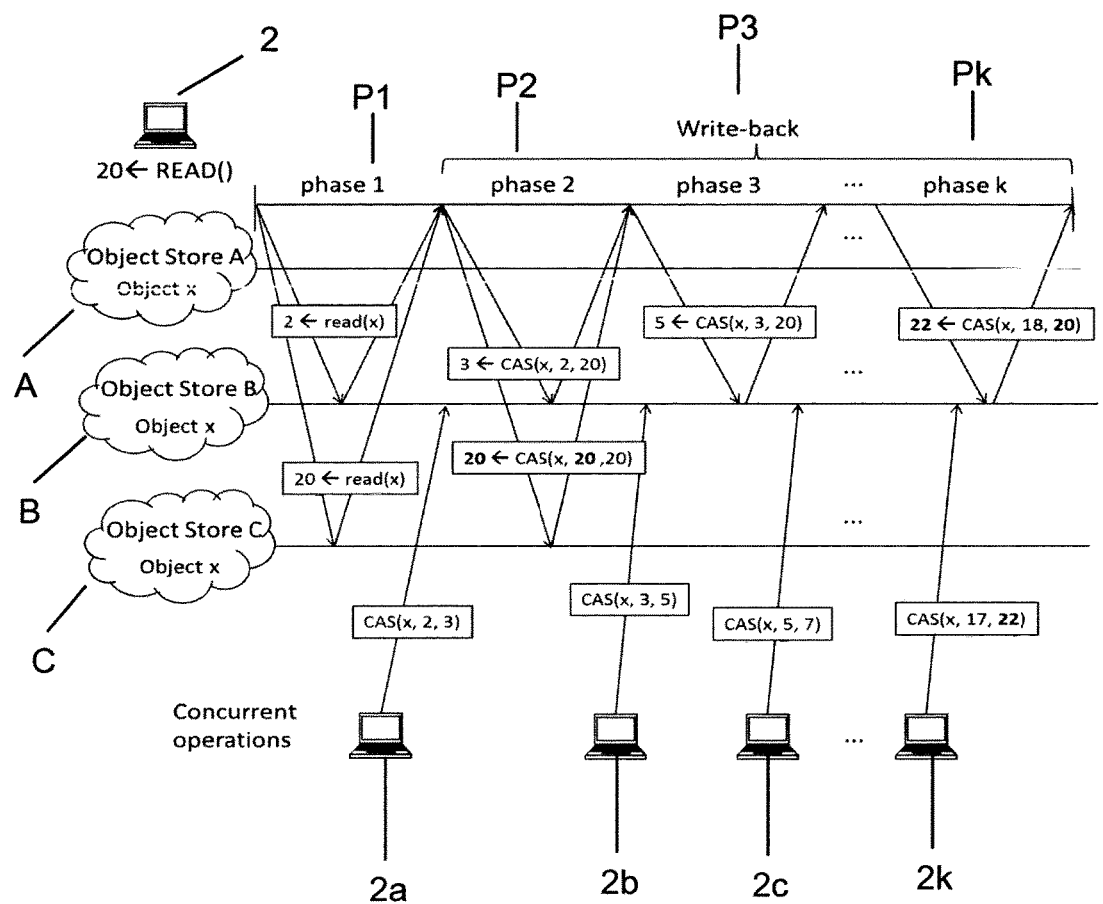
FIG. 3 shows a flow diagram of a part of a method according to a third embodiment of the present invention.

FIG. 3 shows a flow diagram of a part of a method according to a third embodiment of the present invention.

In FIG. 3 a flow diagram of a read operation under contenting operations illustrating wait-freedom is shown.

A client 2 performs a read operation on the cloud storage system 3 for a data object x. In detail in a first phase P1 the client 2 performs a read operation for a data object x in object store B which returns as a result the value v of the data object x and its corresponding timestamp 2. For illustration in FIG. 3 similar to FIG. 2 only the corresponding returned timestamp for the value v is shown. A further read operation for the data object x returns the value v and a corresponding timestamp 20 when reading the data object x from object store C.

After completion of the first phase P1 and before performing a second phase P2 a further client 2a performs a compare-and-swap procedure CAS for the data object x updating the data object x with the value v with a higher timestamp 3 compared to the timestamp 2: CAS(x, 2, 3) Then the client 2 initiates a second phase P2 performing a compare-and-swap procedure CAS for the data object x with the timestamps 2 and 20 of object store B—CAS(x, 2, 20)—and with the values 20 and 20 of the object store C: CAS(x, 20, 20). The corresponding compare-and-swap procedure for object store B returns as result a timestamp of 3 which is different from the old timestamp value 2. Therefore the currently stored value v has a timestamp of 3 due to the (concurrent) write operation of the further client 2a for the data object x in object store B.

Since further concurrent write operations are not performed for the data object x and object store C no further phases are performed for object store C by the client 2.

For object store B a further client 2b performs a compare-and-swap procedure CAS for the data object x with old timestamp value 3 and the newer timestamp value 5: CAS(x, 3, 5). Therefore a third phase P3 is initiated by the client 2: A compare-and-swap procedure CAS for the data object x with timestamp value of 3 as old value and timestamp value of 20 as newest value—CAS(x, 3, 20) is performed returning a timestamp value of 5 for the data object x, since due to the concurrent write operation CAS(x 3, 5), the stored timestamp for the data object x has changed from 3 to 5. Further clients 2c, 2k issuing further concurrent write operations initiate further phases Pk by the client 2 for the object store B are shown in FIG. 3. This is performed until object store B reports a timestamp value which is greater or equal to the timestamp value which is used for the compare-and-swap procedure CAS as newest value. For example in FIG. 3 in phase Pk the compare-and-swap procedure CAS is initiated for the data object x on object store B with an old value of 18 and a newer value of 20 and returns due to the concurrent write operation of client 2k a value of 22 which is higher than the newest value of the compare-and-swap procedure CAS. Then no further phases Pk are performed.

This ensures atomic consistency as well as wait-freedom: A finite number of operations exist that write values with lower timestamps so that consequently every operation by correct clients eventually terminates irrespective of other client's behavior ensuring wait-freedom.

FIG. 4 shows a detailed pseudo-code implementation of parts of a method according to a fourth embodiment of the present invention.

In FIG. 4a a write protocol in form of a detailed pseudo-code with steps carried out by clients when accessing the storage is shown. In FIG. 4b the corresponding read protocol is shown.

The write phase in FIG. 4a is divided into two phases, named PHASE1 and PHASE2. In the first phase PHASE1 an atomic read operation is performed by a client to determine the newest value stored in a quorum by its associated timestamps. Then in a second phase PHASE2 a compare-and-swap procedure is performed. To update an object x a client supplies to the compare-and-swap procedure two parameters for the value v of the object x, namely an old value determined in PHASE1 and the new value. The compare-and-swap procedure checks if the old timestamp value equals the timestamp of the object x and if yes it updates the data object x with the new value in an atomic operation. In any case the compare-and-swap procedure returns the old value for the timestamp of the data object x. The compare-and-swap is invoked only if the timestamp associated with new value is higher than the timestamp of the old value.

Since conditional writes such as compare-and-swap procedure test for equality and not "greater or equal" like in the ABD protocol, before (successfully) updating an object x, the value and its associated timestamps stored in the object x are determined. This is different from the ABD protocol: In the first phase PHASE1 in which the current values and their associated timestamps stored in a quorum Q are determined and then in a second phase PHASE2 in which the quorum Q' is updated and further in contrast to the ABD protocol where there is no relationship between the two quorums Q and Q', by using the compare-and-swap procedure for a subsequent read operation to not miss any update an intersection of Q and Q' needs to be at least a quorum. For example since some server/object stores in Q may be become unreachable for the second phase PHASE2, for example by crashing, additional "late" PHASE1 responses from other servers need to be awaited after switching to the second phase PHASE2.

In summary, an embodiment of the present invention provides a reliable atomic storage layer from multiple unreliable object stores, for example cloud storage systems preferably by using a conditional write application programming interface. The present invention further enables an implementation of a wait-free solution under concurrent access by multiple clients and factoring in late replies to enforce that a quorum is correctly updated providing consistency. The present invention allows the termination when a quorum stores versions greater or equal to the version of a data object written or read by the current operation.

Embodiment of the present invention have, inter alia, the following advantages. Embodiment of the present invention provides robustness, i.e. guaranteed availability and consistency despite asynchrony, concurrency and failures by clients and a minority of object stores. Embodiment of the present invention further allows and easy implementation supporting conditional writes which can be used out of the box without modifications with current storage application programming interfaces. Embodiment of the present invention even further provides storage efficiency, in particular only one value is stored per object per node and this is independent of the number of clients accessing the storage. Even further embodiments of the present invention are efficient in terms of latency: Few remote operations, for example in contention-free executions only two operations, are issued per storage node/object storing entity.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for replicating data in a cloud storage system supporting multiple clients, wherein the cloud storage system comprises a plurality of object stores for storing data objects, the method comprising:

requesting, by a client, values and associated timestamps for a data object from a first quorum of the object stores, determining, by the client, a most recent value of the data object based on the associated timestamps, and performing, by the client, a compare-and-swap procedure, so that the data object is updated with the most recent value and the data object is stored in a second quorum of the object stores, wherein the compare-and-swap procedure, for a respective one of the object stores, includes comparing a requested one of the timestamps from the respective one of the object stores with a current timestamp of the respective one of the object stores and updating the data object with the most recent value based on a determination that the requested one of the timestamps from the respective one of the object stores is equal to the current timestamp of the respective one of the object stores.

2. The method according to claim 1, wherein the method further comprises, before the determining the most recent value of the first-data object based on the associated timestamps:

checking whether the data object has a value with a more recent timestamp than the most recent value of the first data object, and based on the data object having the value with the more recent timestamp, using the value with the more recent timestamp and the corresponding more recent timestamp for performing the compare-and-swap procedure.

3. The method according to claim 1, wherein the compare-and-swap procedure returns the requested one of the timestamps as a result.

4. The method according to claim 1, wherein, based on the data object being modified after the determining the most recent value of the data object and before the performing the compare-and-swap procedure, the compare-and-swap procedure is performed until the data object is not modified anymore between two consecutive performances of the compare-and-swap procedure.

5. The method according to claim 1, wherein during the compare-and-swap procedure, additional responses of object stores not associated with the first quorum are included.

6. The method according to claim 1, wherein, based on the data object being modified after the determining the most recent value of the first-data object and before the performing the compare-and-swap procedure, the compare-and-swap procedure is performed until a quorum of the object stores report values for the data object whose corresponding timestamps are greater than or equal to the timestamp of the determined most recent value of the first data object.

7. The method according to claim 1, wherein the requested one of the timestamps from the respective one of the object stores is an old timestamp and the current one of the timestamps from the respective one of the object stores is a newer timestamp from a compare-and-swap performed by a further client on the respective one of the object stores after the requesting of the values and associated timestamps and before the performing of the compare-and-swap procedure by the client on the respective one of the object stores, the old timestamp and the new timestamp being different from each other such that the compare-and-swap procedure fails and the data object is not updated with the most recent value of the data object.

8. A data replicator in a cloud storage network supporting multiple clients, wherein the cloud storage network comprises a plurality of object stores for storing data objects, the data replicator comprising:

a client configured to:

request values and associated timestamps for a data object from a first quorum of object stores, determine a most recent value of the data object based on the associated timestamps, and perform a compare-and-swap procedure, so that the data object is updated with the most recent value and the data object is stored in a second quorum of the object stores, wherein the compare-and-swap procedure, for a respective one of the object stores, includes comparing a requested one of the timestamps from the respective one of the object stores with a current timestamp of the respective one of the object stores and updating the data object with the most recent value based on a determination that the requested one of the timestamps from the respective one of the object stores is equal to the current timestamp of the respective one of the object stores.

\* \* \* \* \*